US006937156B2

(12) United States Patent
Gardner, Jr. et al.

(10) Patent No.: US 6,937,156 B2
(45) Date of Patent: Aug. 30, 2005

(54) METHOD AND APPARATUS FOR CAPACITIVELY SENSING PESTS

(75) Inventors: James P. Gardner, Jr., Stillwater, MN (US); Louis Mark Holzman, Saint Paul, MN (US); Kraig S. Lund, Longmont, CO (US); Stephen X. Skaff, Owatonna, MN (US)

(73) Assignee: Ecolab Inc., St. Paul, MN (US)

( * ) Notice: Subject to any disclaimer, the term of this patent is extended or adjusted under 35 U.S.C. 154(b) by 169 days.

(21) Appl. No.: 10/400,951

(22) Filed: Mar. 27, 2003

(65) Prior Publication Data

US 2003/0184442 A1 Oct. 2, 2003

Related U.S. Application Data

(60) Provisional application No. 60/428,479, filed on Nov. 22, 2002, and provisional application No. 60/368,647, filed on Mar. 29, 2002.

(51) Int. Cl.[7] ............................................... G08B 23/00
(52) U.S. Cl. ..................................... 340/573.2; 340/562
(58) Field of Search .............................. 340/573.2, 562, 340/563; 119/712; 43/107; 324/658, 663

(56) References Cited

U.S. PATENT DOCUMENTS 3,843,924 A * 10/1974 Wahlgren ................... 324/661
4,862,145 A * 8/1989 Meehan et al. ........... 340/573.2
4,884,064 A 11/1989 Meehan
5,392,732 A * 2/1995 Fry ............................ 119/57.9
6,445,301 B1 9/2002 Farrell et al.
6,707,384 B1 * 3/2004 Shuman et al. ........... 340/573.2
2001/0054962 A1 * 12/2001 Barber et al. ............. 340/573.2

FOREIGN PATENT DOCUMENTS

| EP | 0 283 142 | 9/1988 |
|----|-----------|--------|
| WO | 02/26033  | 4/2002 |

\* cited by examiner

Primary Examiner—Thomas Mullen
(74) Attorney, Agent, or Firm—Merchant & Gould P.C.

(57) ABSTRACT

A method and apparatus for capacitively sensing one or more pests is disclosed. The detector may be employed as either a passive detector and/or as a part of a combined detector and trap. The sensor system includes at least two sensor electrodes and a capacitance sensing circuit. When a non-capacitive object, such as a pest, approaches the sensor electrodes, the capacitance of the sensor electrodes increases due to the object having a higher dielectric constant than air. A capacitance sensing circuit detects the increased capacitance and provides an output signal that a pest has entered the area being monitored. The capacitance sensing circuit may also be constructed to measure the change in the electrode in order to determine the size and/or type of pest based on a characteristic change.

23 Claims, 9 Drawing Sheets

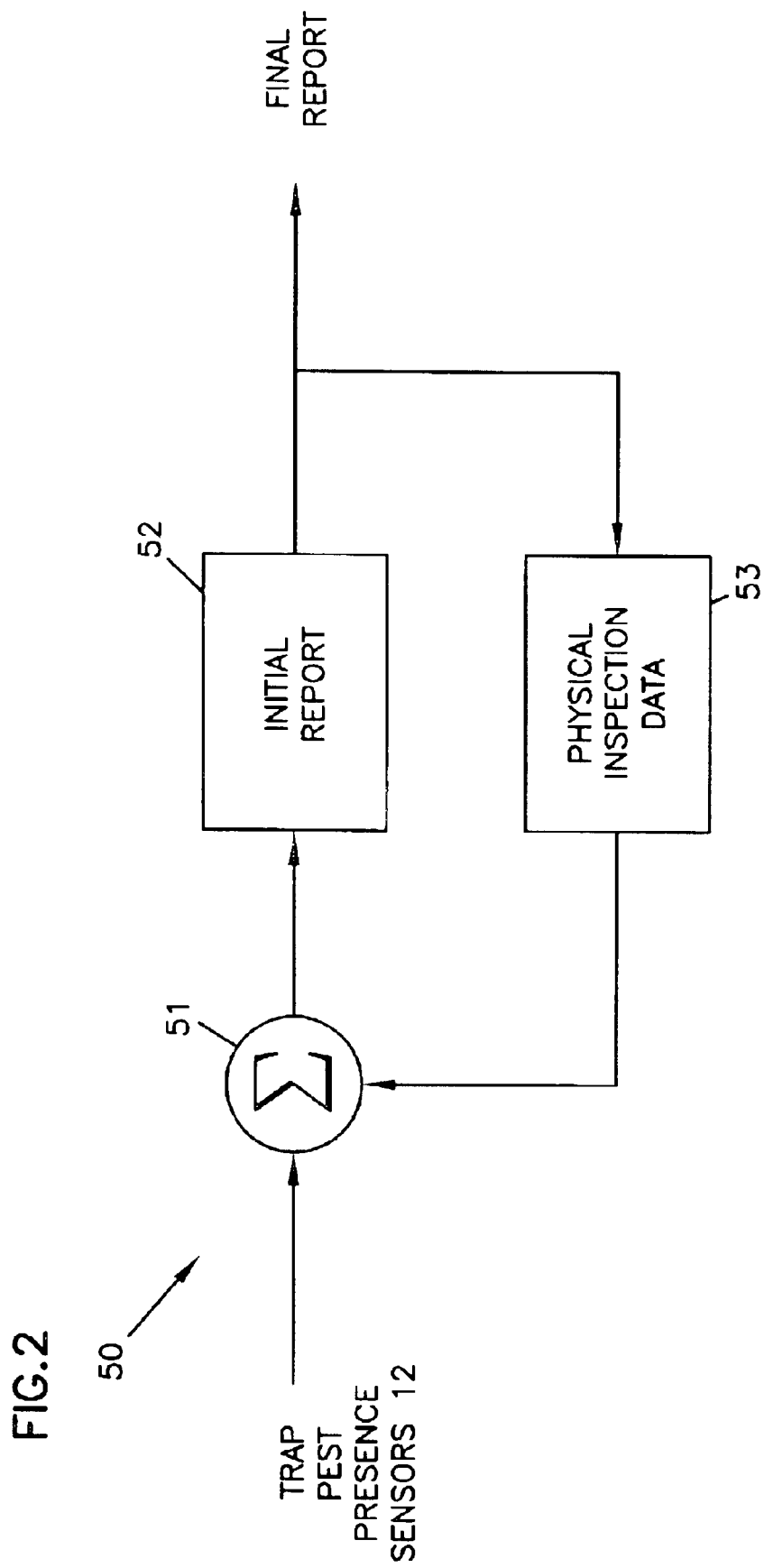

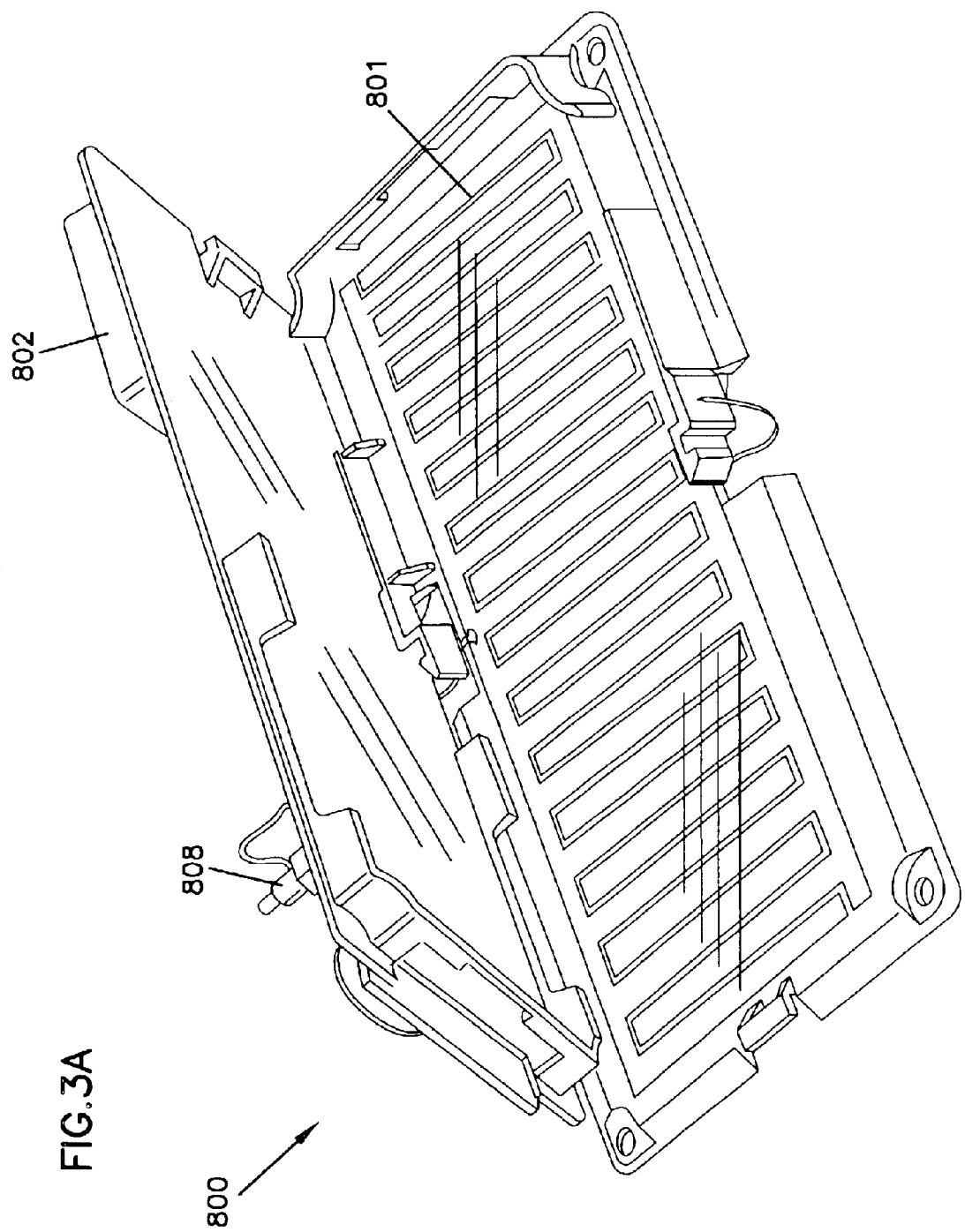

METHOD AND APPARATUS FOR CAPACITIVELY SENSING PESTS

This application claims priority from provisional application Ser. No. 60/428,479, filed Nov. 22, 2002, and provisional application Ser. No. 60/368,647, filed Mar. 29, 2002, and which are incorporated herein by reference.

FIELD OF THE INVENTION

This invention relates generally to a method and apparatus for detecting the presence of a pest; and more particularly to capacitively sensing the presence of one or more pests through use of sensor electrodes and a capacitive sensing circuit.

BACKGROUND

Rodents, flies, cockroaches, and other nuisance insects and animals (hereafter referred to collectively as "pests") create health concerns and introduce spoilage, among other concerns. Many businesses deploy a variety of traps and/or monitors throughout the business' physical premises and facilities to insure a reduction and/or elimination of such pests. These actions can be undertaken to insure inspection compliance, to maintain sanitary conditions, reduce spoilage, comply with applicable laws and regulations, and/or increase consumer confidence. Even upon complete elimination of pests from a physical site, however, the pests can often find their way back into the premises. For example, open doors, windows or loading docks, cracks in foundations, delivery of contaminated materials or packaging, etc., may all provide an avenue for access back into the premises. Therefore, even if the pests are reduced or eliminated, pest traps are continuously used in order to detect the presence of pest activity.

There is also a recognized need to become more efficient in locating and eliminating pests. Spreading large amounts of pesticides over broad areas to control pests without regard to whether there are actually pests in the area (commonly referred to as a shotgun approach) is undesirable. To reduce the risk of inadvertent human contact with the pesticides, a more directed application is preferable. Further, as the number of traps used in a facility increases, the time associated with checking the status of the traps also increases. This results in higher costs. Accordingly, there is a need in the art for a reduced and more targeted application of pesticides, as well as a need for an apparatus and method for detecting pests so that the targeted application can be efficiently applied and an appropriate number of traps may be utilized in those areas in which pests are located or active.

Prior methods of detecting pests include utilizing a single beam of light that is incident on a detector. This type of application is typically found in environments where a limited point of access is available—such as in a beehive. However, due to the limited zone in which pests will trip the light beam, this type of system has significant drawbacks. This drawback is exacerbated when the size of the monitored area increases and/or when there are multiple points of entry or a non-specified point of entry. Typically there are multiple approaches to an insect harborage. Accordingly, this type of sensor has a limited functionality in such an environment. Another system employed in the prior art is thermal detection based on IR. An example of this type of system is disclosed in U.S. Pat. No. 6,445,301 to Farrell et al. However, insects are not generally sensed by such thermal systems. There are also size issues related to the pests being detected. Therefore, each of the prior art systems has drawbacks in detecting pests.

Therefore, there is a need in the art for a pest detecting system which detects both rodent and insect pests. Such a system would preferably include a sensitivity to enable determining which type of pest was sensed. Additionally, such a system would preferably be available to be used as either a passive detector and/or as a part of a combined sensor and trap. The present invention overcomes the shortcomings of the prior art and addresses this need in the art.

SUMMARY

The present invention provides for a method and apparatus for capacitively sensing the presence of one or more pests. In embodiments constructed in accordance with the principles of the invention, it may be employed as either a passive detector and/or as a part of a combined sensor and trap.

The sensor system includes at least two sensor electrodes and a capacitance sensing circuit. Briefly, in operation, when a non-capacitive object (such as a pest) approaches the sensor electrodes, the capacitance of the sensor electrodes increases due to the object having a higher dielectric constant than air (e.g., the medium which couples the electrodes prior to the approach of the object). It should be noted that a capacitive object would also increase the capacitance of the sensor electrodes because it forms a counter electrode and has the effect of decreasing the separation between the electrodes. A capacitance sensing circuit detects the increased capacitance and provides an output signal that a pest has entered the area being monitored. The capacitance sensing circuit may also be constructed to measure the change in the electrode in order to determine the size and/or type of pest based on a predetermined characteristic change.

One feature of the present invention is that it may be employed as a passive counter wherein the pest approaches the counter through random motion and/or curiosity. Alternatively, an attractant may be employed in connection with the system. The attractant may be either a chemical or food attractant. Still further, the physical design of the system may be constructed wherein the attraction is inherent in the physical structure—e.g., including a small enclosed area to attract cockroaches.

The output of the capacitance sensing circuit may be used to determine the time and activity of the monitored pests. In the case of a passive counter, the activity of the pests may be determined without capturing the pests. This type of system may have benefits when the monitored area is in a public area (e.g., where the sight of captured pests is not desired). The monitored data may include the number of detected events, the time and date, and other parameters such as temperature, light and humidity. In the case where a differing signal is detected and interpreted, there may be instances in which a plurality of pests is determined to have triggered the system. In the case of a system which also includes a trapping function, the monitoring may provide, in addition to the information provided in a passive device, a mechanism to report that the trap needs to be checked and to provide information on when the pest entered the trap.

Therefore, according to one aspect of the present invention, there is provided a capacitive pest monitor apparatus, comprising: a plurality of capacitive electrodes; a capacitive sensing circuit, operatively connected to the capacitive electrodes, the capacitive sensing circuit detecting the capacitance of the of the electrodes and detecting changes in the capacitance due to pests passing over the capacitive electrodes and generating a pest detection signal; and a pest detection signal storage device, the storage device operatively connected to the capacitive sensing circuit, the storage device receives the pest detection signals and stores the signals for later analysis.

According to a further aspect of the invention, there is provided a capacitive pest monitor apparatus, comprising: a plurality of capacitive electrodes; detecting means for detecting changes in the capacitance of the electrodes, the detecting means operatively connected to the capacitive electrodes and arranged and configured to generate a pest detection signal; and event storing means, operatively connected to the detecting means, for storing the number of pest detection signals as events, the event storing means arranged and configured to store each event with a real time indication of the time and date.

According to yet another aspect of the invention, there is provided a method of detecting the presence of one or more pests by detecting changes in capacitance between a plurality of capacitive electrodes, comprising: measuring the capacitance of the electrodes; generating a pest detection signal upon measuring a predetermined change; and storing the number of pest detection signals as events combined with a real time indication of the time and date of each event.

According to a further aspect of the invention, there is provided a pest reporting system, comprising: a pest report database; a plurality of capacitive pest detecting sensors, the capacitive pest detecting sensors associated with respective activity sensing pest devices, the sensors being arranged and configured to determine if a pest is in the area monitored by the sensor and to generate a pest signal, manual input sensors associated with the respective activity sensing pest devices, the sensors being arranged and configured to accept additional manual input; and a communication device, operatively connected to the capacitive pest detecting sensors and the manual input sensors, for receiving the pest signal and for communicating to the pest report database that a pest signal occurred and the specific activity sensing pest device at which the pest signal occurred, and wherein the pest report database is updated.

A further aspect of the invention in accordance with the preceding paragraph includes utilizing a personal digital assistant (PDA) as the communication device.

While the invention will be described with respect to preferred embodiment configurations and with respect to particular devices used therein, it will be understood that the invention is not to be construed as limited in any manner by either such configuration or components described herein. Also, while the particular types of pests and traps are described herein, it will be understood that such particular pests and traps are not to be construed in a limiting manner. Instead, the principles of this invention extend to any environment in which pest detection is desired. Further, while the preferred embodiments of the invention will be generally described in relation to use of sensor electrodes and a capacitive sensing grid, it will be understood that the scope of the invention is not to be so limited. These and other variations of the invention will become apparent to those skilled in the art upon a more detailed description of the invention.

The advantages and features which characterize the invention are pointed out with particularity in the claims annexed hereto and forming a part hereof. For a better understanding of the invention, however, reference should be had to the drawings which form a part hereof and to the accompanying descriptive matter, in which there is illustrated and described a preferred embodiment of the invention.

BRIEF DESCRIPTION OF THE DRAWINGS

Referring to the drawings, wherein like numerals represent like parts throughout the several views:

FIG. 2 is a schematic diagram of the report generation process of the system of FIG. 1.

FIG. 3a illustrates a perspective view of an insect monitor having an electrode grid (and the cover partially removed) constructed in accordance with the principles of the present invention.

DETAILED DESCRIPTION

Figure 1:
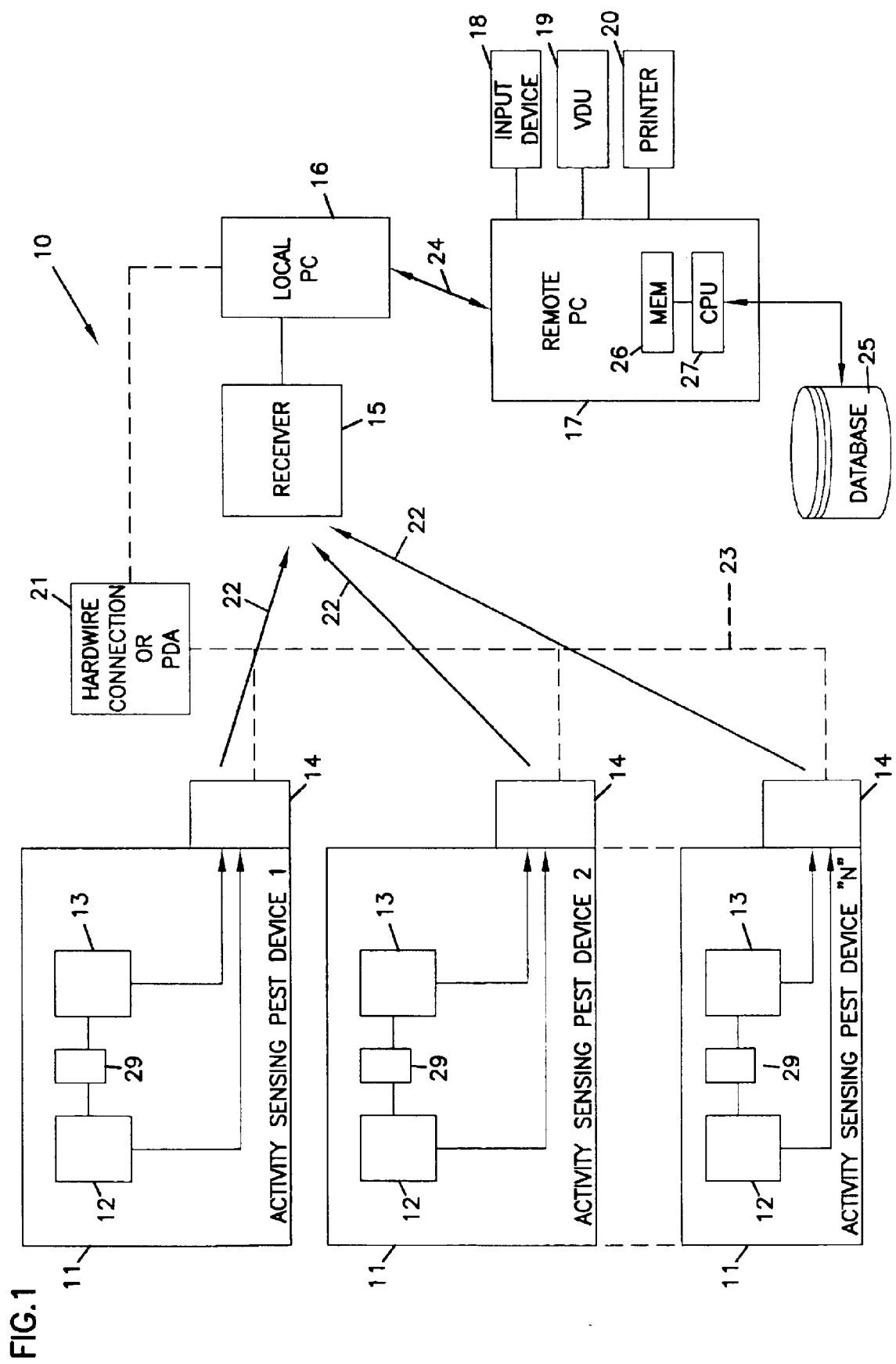
FIG. 1 is a functional block diagram of an automatic pest control report generation with additional trap parameter data system.

The present invention provides for a method and apparatus for capacitively sensing one or more pests and counting the number of sensed pests. In embodiments constructed in accordance with the principles of the invention, the detector may be employed as either a passive detector and/or as a part of a combined detector and trap. The detector may be used alone or can be used in connection with other devices as part of a report generation system, and also can include the ability to provide additional data on the pests that are detected and/or trapped. Further information may also be logged including movement of the trap, time and date, temperature, light intensity (e.g., day, night, etc.), among other parameters.

The sensor system includes at least two sensor electrodes and a capacitance sensing circuit. As a non-capacitive object (e.g., a pest) approaches the sensor electrodes, then the capacitance of the sensor electrodes increases due to the object having a higher dielectric constant than air. However, the approach of a capacitive object will also be sensed by the detector since the it forms a counter electrode and has the effect of decreasing the separation between the electrodes. A capacitance sensing circuit detects the increased capacitance and provides an output signal that a pest has entered the area being monitored. The capacitance sensing circuit may also be constructed to measure the change in the electrode in order to determine the size and/or type of pest based on a predetermined characteristic change. Such changes may be determined by experiment and observation.

As noted above, the present invention may be employed as a stand alone detector or as a combined detector and trap. Further, the present invention can be used by itself or can be utilized in a larger detection and trapping environment. Accordingly, a detailed discussion of the capacitive pest sensor method and apparatus will now be deferred pending a discussion of an automatic pest trap report generation and additional trap parameter data logging environment in which the present invention may be employed.

Automatic Pest Trap Report Generation and Additional Trap Parameter Data Logging Environment The automatic pest trap report generation and additional trap parameter data logging environment system may include a variety of styles of activity sensing pest devices within a single facility (e.g., for trapping or sensing any type of animal, rodent, fly or insect) and utilizing a single reporting database; include individual styles of activity sensing pest devices in different reporting databases for the same facility; and/or include a single type of activity sensing pest devices in one or more reporting databases. In each case, the principles apply to an automatic, real-time reporting system for a plurality of activity sensing pest devices (e.g., traps and/or pest presence monitors), with manual input means for providing additional data on both the pest trap and pest monitor parameters based on physical inspection. A reporting database collects the data and provides reports on the resulting combined data. The system reports have greater utility, improve time, costs and efficiencies associated with inspection of the traps, and improves pest control.

First referring to FIG. 1, a functional block diagram of the automatic pest report generation system and additional pest trap and pest monitor parameter data is provided. The system is shown generally by the designation 10. A plurality of activity sensing pest devices are shown at the designation 11. Any number of "N" activity sensing pest devices 11 may be utilized in connection with the present invention. In the case of traps, each of the N traps 11 include a pest enclosing, retaining or killing device (best seen in FIG. 3c discussed further below). One or more of the activity sensing pest devices 11 can also take the form of a passive or active pest monitor—which monitor may or may not include a trapping device. A pest sensor 12, a physical inspection data entry device 13, and a communication block 14 are also provided.

Pest sensor 12 may take a number of forms, but in each form generally monitors pest activity in and/or about the trap 11. Examples of the pest sensor 12 include a switch or mercury switch (for monitoring movement of the trap), a capacitance device (for monitoring a pest altering the capacitance of a grid), a current monitoring device (for detecting current spikes in a destructive or electrocution style trap), or light extinction of a light source (for monitoring an interrupted beam or laser). The sensor 12 is generally located in or on the pest trap 11. However, it is possible to also locate the pest sensor 12 adjacent or proximate the trap 11. It will be appreciated that sensor 12 may be located in an area without a trap being present. In this latter case, the sensor 12 acts as a pest monitor for that area. When pest activity is detected and a pest presence or detection signal is generated by the sensor 12, the pest presence signal is provided to the communication block 14.

The communication block 14 may take a number of forms. For example, the communication block may communicate over a fixed wire (e.g., to hardwire receiver 21 via optional connection 23) or by telephone or cellular phone, it may take advantage of putting signals over existing wiring in a building, or it may utilize over-the-air transmissions designated as 22. In each of these forms, the communication block 14 operates to pass the pest presence or detection signal—as a pest event—to a receiver 15 (or alternatively directly to local PC 16). In one embodiment, an RF type communication device is utilized. In this type of embodiment, the receiver 15 will generally be located relatively close to the transmitter device in communication block 14. However, the range is affected by, among other factors, the type of RF device used and by the structural characteristics of the facility or area. If appropriate communication schemes are utilized, then the receiver 15 may be located off-site. In a second embodiment, a PDA device 21 is utilized to gather the data. In this case, either a cradle (not shown), an IR based connection; or other connection (shown generally as optional connection 23) may be used.

Sensor 12 may include a memory device or other data storage to accumulate event data and then pass along a block of information to the communication device. For example, sensor 12 may be constructed to archive pest presence signals in an onboard memory location or in a separate memory device 29. The later communication of the stored data may occur at set intervals, may be prompted by a polling transaction, or may be physically activated by an inspector via a personal computer, special purpose computing device, or PDA. By storing the data, any number of pest detection events may be transmitted as a block.

In one embodiment the sensor may archive event data in the counter block 805. The counter block 805 can include an electronic memory storage location, and can optionally include a visually perceptible means for displaying the data such as an LCD display or mechanical counter (not shown). The microprocessor block 804 can initiate transmission of the collected data via communications block 807. This can take the form of a PDA 21 establishing contact with the communications block 807 or take another of the forms identified above. The data can be passed as individual event data or as histograms of the number of events within different time windows.

The sensor 12 provides data on the activity sensing pest devices 11 identifier code, the time of the event, and the event itself. However, the PDA 21, receiver 15 or local computer 16 (discussed below) may provide a date stamp for the received pest event. Unless the context provides otherwise, for convenience it will be assumed that the methodology utilized to transmit the data from the sensor is an RF system. Those skilled in the art, however, will appreciate that other methodologies described herein and equivalents may be employed to implement such communication.

Once the event is transmitted to receiver 15, the data is provided to local computer 16. Computer 16 may be a special purpose computing device or may be a personal computer (e.g., an IBM compatible computer having a Pentium style chip). The data is in turn provided to remote personal computer 17 over the internet or direct connection 24. Computer 17 includes a processor 27, input devices 18 (e.g., keyboard and mouse or other pointing device), video display unit 19, and a printer 20. CPU 27 is provided to run a database program stored in memory 26. The program may also be running from a hard drive, floppy drive, CD-ROM, or from a server or other computer on a network machine. The database 25 is stored in memory 26. It will be appreciated that the database may also be stored on a local area network server, hard drive, cd-rom drive or other storage device accessible by the CPU 27.

Database 25 stores the event data and includes other database functions, such as relating events to pest trap identification numbers, and generating reports, among others. A number of commercially available relational database programs may be used capable of storing and relating fields in a number of records. A report writing capability is also desirable. The received data from the various activity sensing pest devices 11 must be recognized by the computer 17 and stored in the database 25. The database 25 can reside on local computer 16 with reports being generated locally and, optionally, transmitted to other computers via a network, extranet or internet.

In the database 25, the activity associated with each activity sensing pest devices 11 may be tracked by the unique ID number. The facility of interest contains any desired number of activity sensing pest devices 11 and the location of the activity sensing pest devices 11 are maintained with the unique ID number to be used in the reporting process. Desirable reports include trap activity data for a specific trap, the activity of traps which have initiated pest presence signals (and other traps which should be visited according to some determined schedule), a summary report with additional trap parameter data added following a physical inspection of the trap(s) and a summary report for each of the traps.

In order to provide the feedback information, each activity sensing pest device 11 also preferably includes one or more feedback devices 13 which permit an inspector to provide physical trap and monitor parameter feedback at the actual location of the activity sensing pest devices 11. This additional data is preferably input to the database 25 running on computer 17 (via the communication block 14 to receiver 15 to local computer 16). The feedback device 13 may take the form of one or more buttons; a keypad; a keyboard; one or more dipswitches; an infrared receiver which is configured to interact with a PDA 21 (e.g., of the type sold under the designation Palm Pilot or other personal data device), or any other input device allowing selection among a plurality of parameter ID's such as those set forth in Table I below. In each case, the device 13 allows an inspector to indicate a particular parameter, from among a predetermined set of parameters. For example, an inspector could indicate that a trap was inspected and no animal was found or that the trap was inspected and an animal was found. Table I includes a representative list of codes which may be utilized by a trap inspector.

TABLE I

| Parameter ID | Parameter Description |
| --- | --- |
| 1 | Trap Checked—No Activity |
| 2 | Trap Checked—Activity Type 1 Found |
| 3 | Trap Checked—Activity Type 2 Found |
| 4 | Trap Checked—Activity Type 3 Found |
| 5 | Trap Cleaned |
| 6 | Trap Out of Place |
| 7 | Trap Damaged |
| 8 | Light Bulb Replaced |
| 9 | Glueboard Replaced |
| 10 | Cover Opened |

It will be appreciated that the trap parameter/data is exemplary and other information may be provided. Further, the Parameter ID number is assigned arbitrarily above. In other systems, the parameter ID number may be associated with other trap parameters.

The feedback data can alternatively be entered directly into local computer 16 by an operator after physically inspecting the traps. The data might also be temporarily stored during the inspection in a PDA 21 or other special computing device, and subsequently downloaded into computer 16. In these embodiments, it will be appreciated that the input block 13, communication block 14 and receiver block 15 may be modified to function properly with the data gathering methodology employed. However, transmission of initial data on pest activity is preferred in order to generate an initial report (for example visits to the appropriate activity sensing pest devices can then be determined).

Preferably each activity sensing pest device 11 includes a feedback mechanism 13. Due to the characteristics of the physical premises, the costs, the benefits from the individual activity sensing pest device 11, and other factors, one or more of the activity sensing pest devices 11 may not include a feedback sensor 13. However, in view of the advantages provided by the feedback reporting system as described herein, it will be appreciated that the benefits increase as the amount and quality of the feedback data increases.

Once transmitted to the database 25, the additional parameter data on the activity sensing pest devices is also tracked against the appropriate ID number. This results in a refining of both the data and the resulting reports from database 25. The activity sensing pest devices reporting becomes a feedback loop as illustrated in FIG. 2 by the designation 50. In FIG. 2 the sensors 12 provide data to summing block 51 and to initial report block 52. The physical inspection component of the process includes reviewing the initial report(s) 52 and providing additional physical inspection data at block 53. The physical inspection data can include data on each trap and monitor 11. However, preferably the data is for a smaller set of traps and monitors, which include those traps and monitors that generated a pest activity event signal and a number or percentage of the remaining traps and monitors of the "n" activity sensing pest devices 11 in the facility that did not show any pest activity.

The feedback loop provides data on false positives, disturbed traps, and other factors. The time data corresponding to when the pest activity occurs helps to proactively determine pest infiltration factors and/or information relating to maintaining an optimum pest control plan, such as disturbed traps, etc.

The various styles of traps 11 may include a large variety of commercially available traps for trapping any type of animal, such as rodents or insects. Examples of commercially available live animal/rodent traps are the Victor M310 Tin Cat; the Havahart Live Traps; the Kwik Katch Mouse Trap, and the Kness Ketch-All. Examples of commercially available zapping light traps are the Gardner AG2001; the Gardner AG-661 Light Trap, and the Anderson Adhesive Insect Light Trap. Examples of commercially available glueboard light traps are the Ecolab Stealth Unit; the Gardner WS25; the Gardner GT100, and the Anderson Adhesive Insect Light Traps.

Capacitive Pest Sensor Method and Apparatus

Figure 3B:
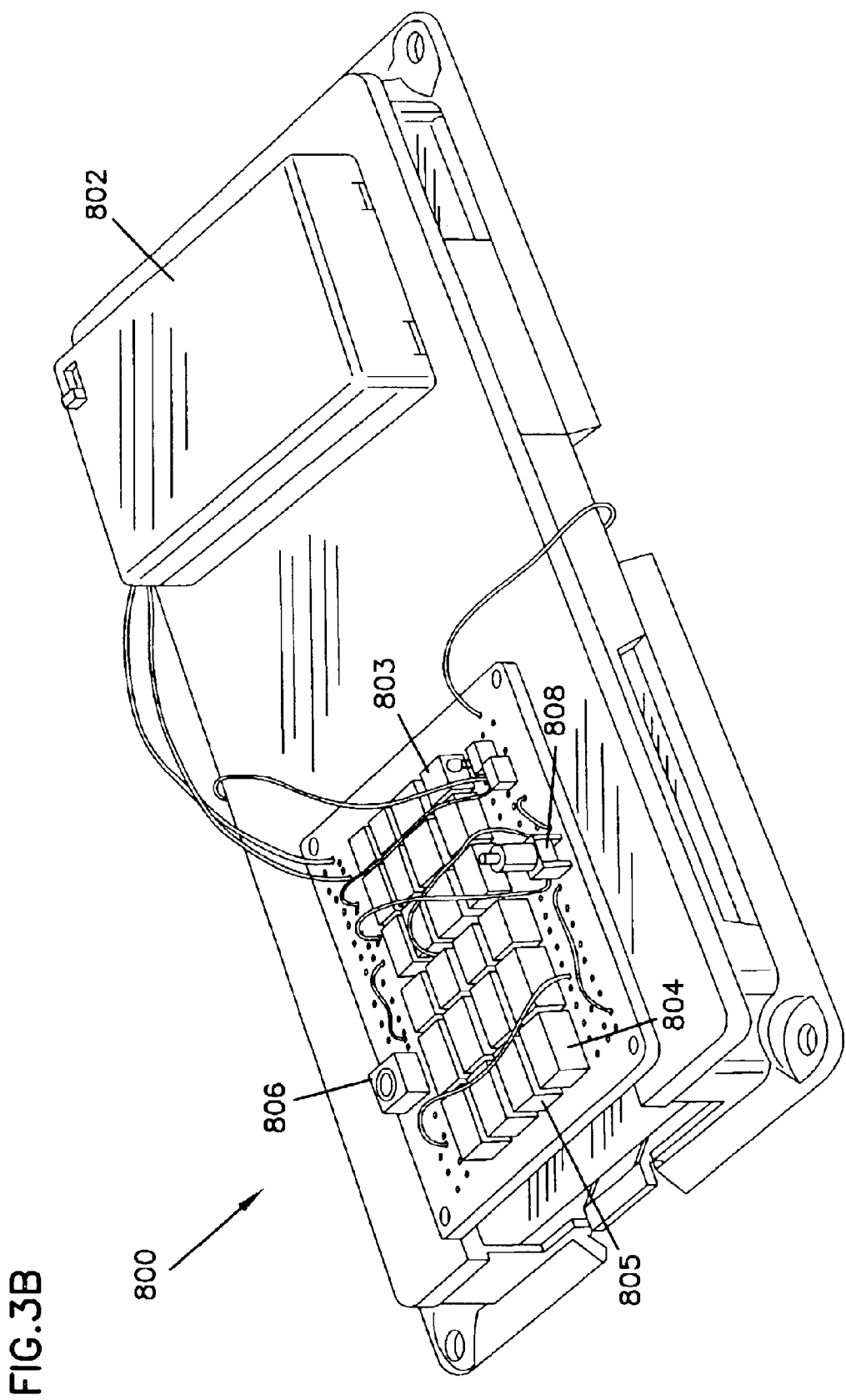
FIG. 3b illustrates a perspective view of the monitor of FIG. 3a with the cover of the insect monitor in place.
Figure 3C:
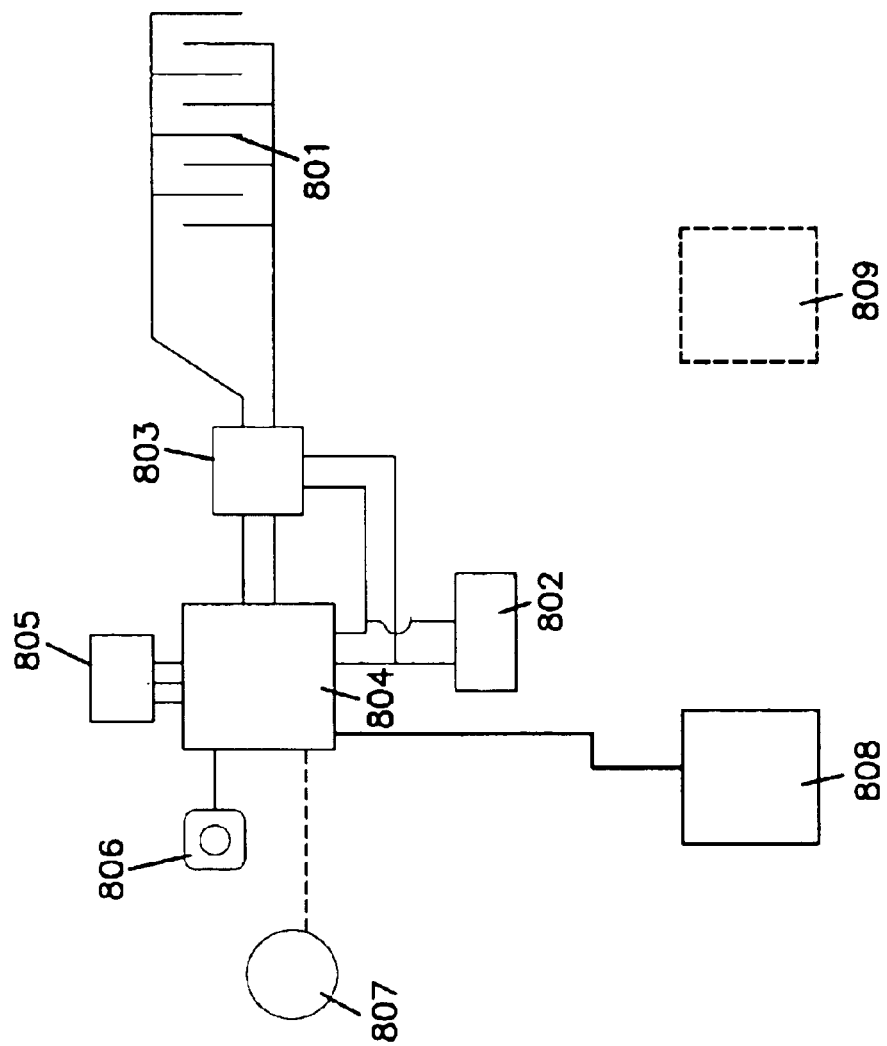
FIG. 3c schematically illustrates a functional block diagram of the insect monitor of FIG. 3a constructed in accordance with the principles of the present invention.

Referring now to FIGS. 3a–3c, an insect monitor 800 with electrode grid 801 is illustrated. Capacitive sensing block 803 is operatively attached to the grid 801. Power block 802 is connected to the capacitive sensing block 803 and to the microprocessor block 804. Memory block 805 is connected to the microprocessor block 804 (and/or the microprocessor can have its own on board memory; not shown). Switch block 808 is connected to the microprocessor block 804 to provide user feedback input. IR device 806 is provided to enable input and output communication with a PDA 21 or other IR communication device. An RF device 807 may also be connected to microprocessor block 804 to provide RF communication for the monitor 800.

Capacitive sensing block 803 is arranged and configured to detect changes in the capacitive coupling between the electrodes of grid 801. When an insect enters the monitor 800, the insect provides capacitive coupling between the electrodes of the grid 801. The change is sensed by the capacitive sensing chip 803. The time and date of the event is determined by the microprocessor block 804 and may be stored in memory 805 or can be transmitted directly to a computer 16 via RF device 807. If the data is stored in memory block 805, it may be transmitted at a latter time (e.g., in a batch mode) via RF device 807; it can be stored for transmission to a PDA device 21 via IR device 806; and/or it can be transmitted after additional data is entered at manual input device (switch) 808. If RF device 807 provides for two way transmission, the information can also be transmitted after a polling transmission by computer 16 (via receiver block 15).

Prior art devices of this type of monitor are often accomplished by use of glue boards with plastic covers or strategically placed attractants. A limitation of these devices is that a service technician does not have the ability to determine when the activity occurred during the service cycle. The monitor shown in FIGS. 3a–3c allows the comparison not only of activity in multiple monitors but also allows technicians to determine if activity occurred at the same time. An additional limitation of traditional monitors is that technicians can report they visited a monitor without actually having visited the monitor. Therefore, the feedback buttons 808 (best seen in FIG. 3c) insure that the monitor was inspected, as well as documenting the inspection process. A further benefit of the monitor 800 of FIGS. 3a–3c is that the monitor does not have to immobilize the insect to communicate the activity to the inspector. This benefit allows the database 25 to report on the activity in a facility without causing customers or inspectors to view unsightly insects.

Block 809 illustrates an optional trapping option used in connection with the detector. The trap 809 may be a glue board, electrocution grid, passive trap, etc. The detector can include a sensor to sense if a pest has been trapped in order to provide a pest or no pest signal and/or to trigger a signal indicating that the trap should be checked. The output signal can be a visible or audible indicator that is integral to the trap, or a signal that is transmitted to a remote location. Remote signaling may be accomplished via phone, internet, RF signal and other well known transmission schemes.

Figure 4B:
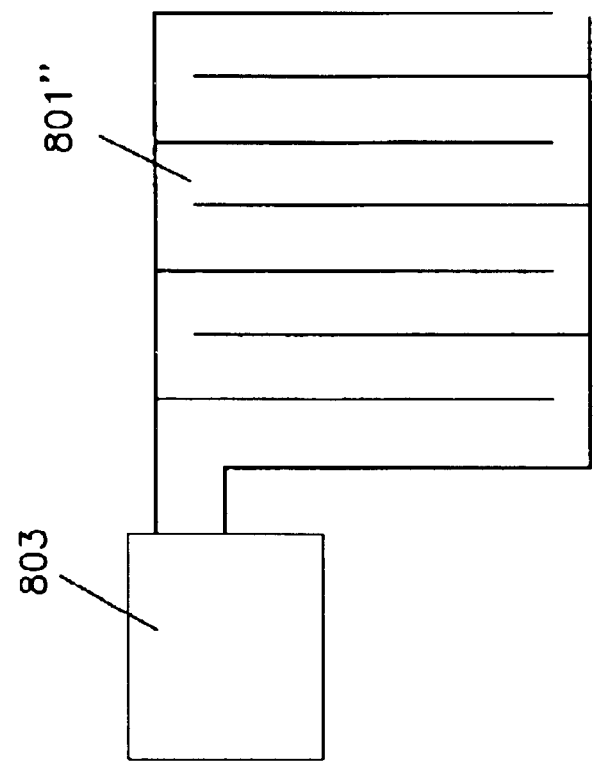
FIGS. 4a and 4b illustrate first and second embodiments of the electrodes of the capacitive detector.
Figure 4A:
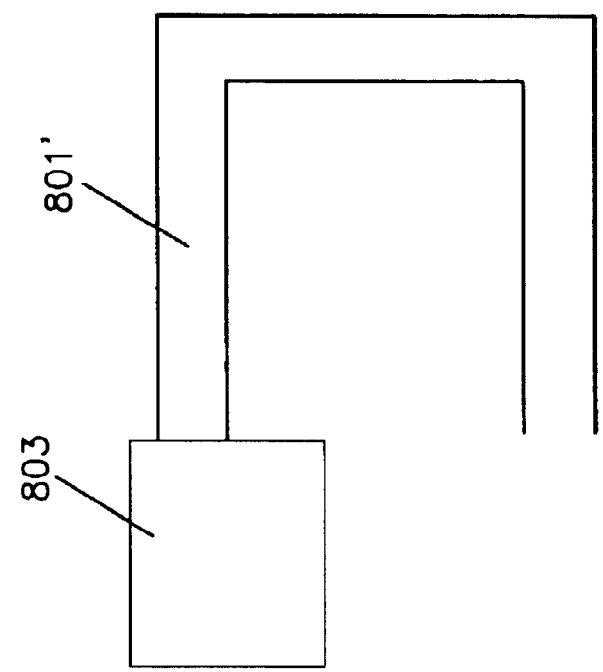

FIGS. 4a and 4b illustrate first 801' and second 801" embodiments of the electrode grid 801 of FIG. 3c respectively. FIG. 4a illustrates a perimeter design 801' having two parallel lines. In this design, a pest is sensed when it interacts with the electric field associated with the lines. When this occurs, the capacitance changes while the pest is in the proximity of the line(s). This type of design lends itself well to extending about the perimeter of an area to be monitored. However, the lines do not have to extend about the entire perimeter of the area. It will be appreciated that different configurations may be desirable depending on the type of pests being monitored and the physical premises. FIG. 4b illustrates an area design 801" having an interdigitized style electrode grid. Here the capacitance changes when a pest enters the area. The capacitance then stays at approximately the same value as long as the pest remains in the area. If a second pest enters the area (and/or if the first pest leaves the area), then the capacitance changes to a new level and the presence of the pest can again be detected. This type of design lends itself well to monitoring an area.

The electrode 801 may be constructed separately out of copper foil or other conductive metal. Alternatively, the electrode 801 may be constructed integrally with a circuit board of the sensor system.

Figure 5A:
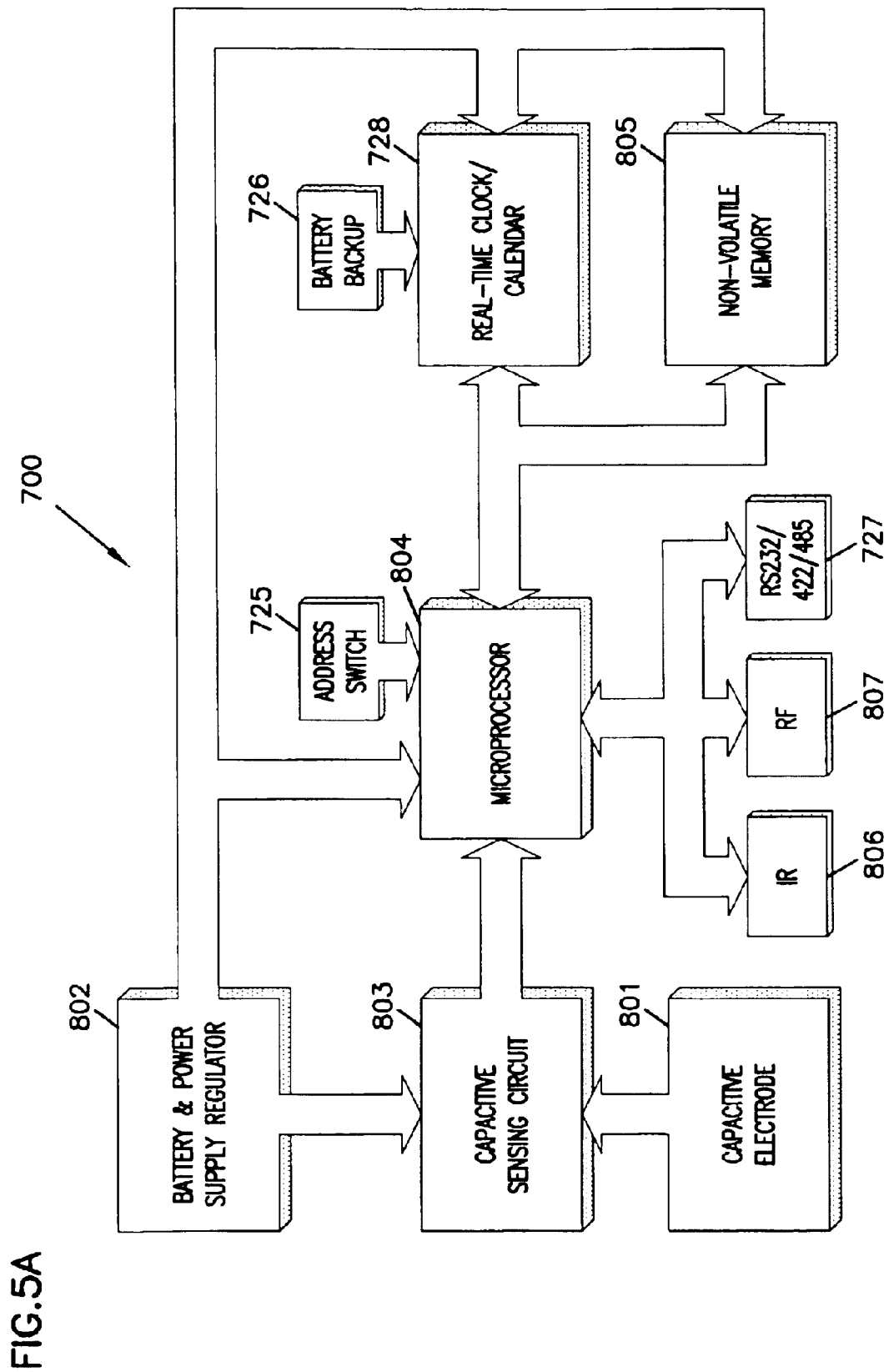
FIG. 5a schematically illustrates a functional block diagram of the capacitive detector 700 wherein the device includes a microprocessor.
Figure 5B:
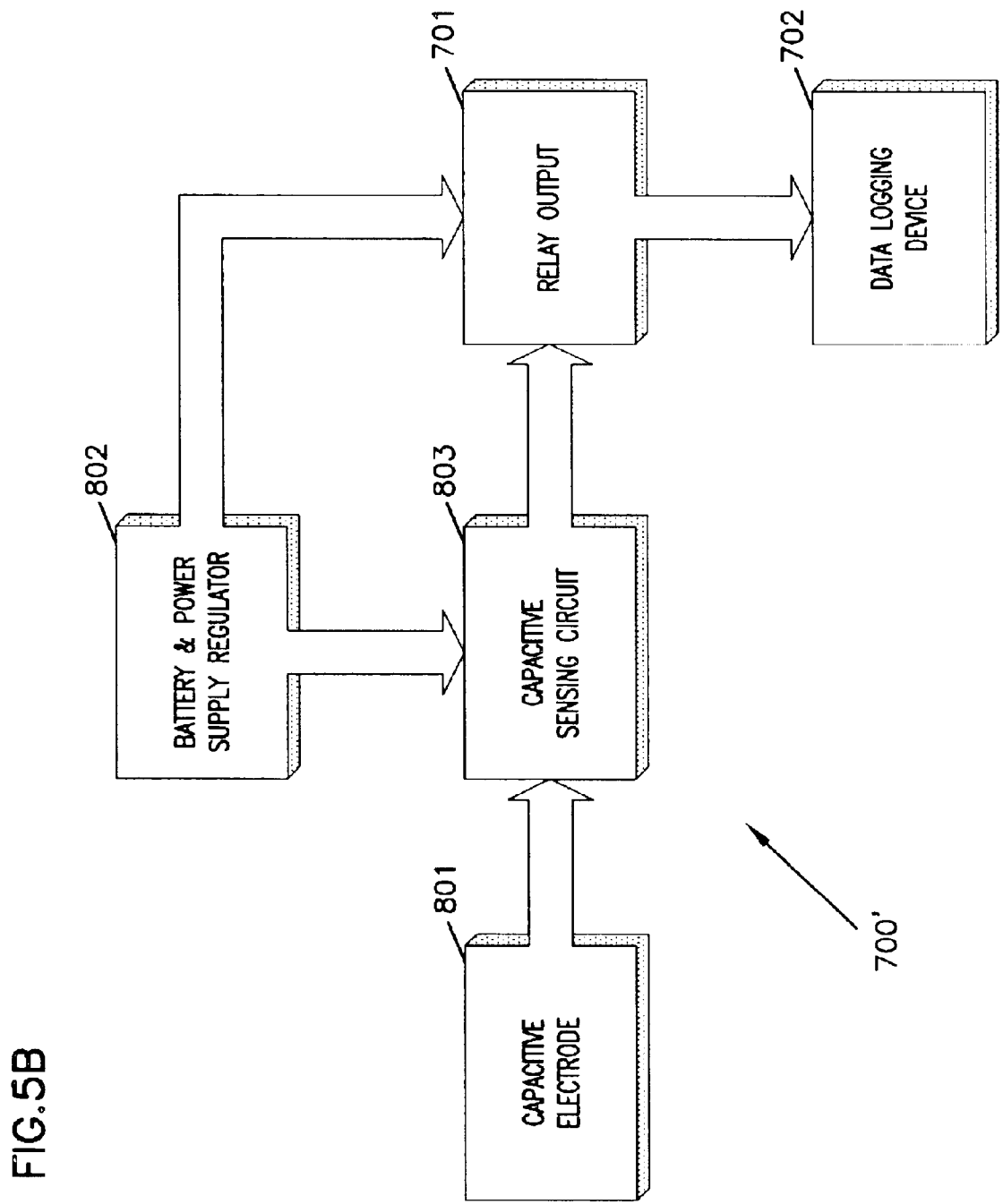
FIG. 5b schematically illustrates a functional block diagram of the capacitive detector 700' wherein the device does not include a microprocessor.

FIGS. 5a and 5b graphically illustrate alternative embodiments in which a microprocessor is utilized (FIG. 5a) and in which a microprocessor is not utilized (FIG. 5b). Turning first to FIG. 5a, a functional block diagram of the capacitive detector 700 is illustrated wherein the device includes a microprocessor substantially as described above in connection with FIG. 3c. However, in FIG. 5a, an address switch 725 for the microprocessor 804, a battery backup 726 for the real-time clock calendar block 728, and an additional output port block 727 (preferably an RS-232 or 422 and/or 485 port) are also shown.

In the preferred embodiment, the various functional blocks may be generally implemented with commercially available chipsets. The microprocessor block 804 preferably provides processing functionality and includes a processor such as the Microchip PIC16F873. The memory block 805 preferably provides non-volatile memory functions and may be implemented with a serial EEPROM device such as 24LC256 chip manufactured by Microchip. Such device is a CMOS design to provide for low power consumption. The real-time clock calendar block 728 providing time and date capability may be implemented with a serial real time clock/calendar chip such as the PCF8563 CMOS chip manufactured by Philips. The communications block 727 may be implemented with an RS-232 transceiver chip of the type designated MAX3226E manufactured by Maxim. The capacitive sensing circuit block 803 may be implemented with a capacitive sensing circuit manufactured by Quantum Research Group under the designation Qprox QT113. The address switch block 725 for setting a device ID or device addresses may be implemented with any number of switch type devices, including a six-position dip switch.

The preferred devices used to implement the embodiment illustrated in FIG. 5a collectively provide for a low power device capable of operating for extended periods (e.g., 3–6 months) on a low power voltage source (e.g., three standard AA alkaline batteries). The low power consumption is achieved due to the low quiescent current requirements of the preferred devices for the voltage regulator block 802, the memory block 805, the real-time clock/calendar block 728, and the RS-232 communication block 727. The microprocessor block 804 also supports low power consumption by utilizing a low power mode. The low power mode includes a sleep command that turns off the oscillator driver. When the oscillator is turned off, then the device may run on a standby current of less than 1 $\mu A$.

In operation, the microprocessor block 804 initializes by obtaining the device ID from the address switch block 725. A default date and time are then set. A thirty (30) minute alarm is set in the real time clock ("RTC") block 728. Finally, the memory block 805 pointers are set to zero. After initialization the microprocessor block 804 puts itself in the low power mode (i.e., sleep mode) to conserve battery power. The microprocessor block 804 is awakened from sleep mode by any one of three sources: the capacitive pest sensor block 803; the RTC block 728; or the communications port block 727.

When the capacitive pest sensor block 803 senses a pest, then microprocessor block 804 'wakes up' from sleep mode and adds one count to the running pest count. The new count value is stored in memory block 805. The microprocessor block 804 then returns to sleep mode. The microprocessor block 804 wakes up every thirty (30) minutes based on a wake-up call (i.e., an alarm) programmed into the RTC block 728. The microprocessor block 804 logs the date, time and the current pest count number in the next available memory block 805 space.

The microprocessor block 804 also wakes up from input to the communications port block 727. The communications port can then be used to set the device date and time, read the device date and time, read the device data log of stored pest activity, clear the device data log, and read the device ID dip switch setting. Other parameters may be logged such as light intensity, temperature, movement of the detector, etc. When the communications port block 727 is disconnected, the microprocessor block 804 returns to sleep mode.

A software algorithm arbitrates priority of the wake up modes. Input from the capacitive sensing block 803 is the top priority. Data logging of pest activity on alarm intervals is second priority. The lowest priority is given to the communications port block 727.

Another feature of the device is a power-OK or low battery function of the power block 802. The voltage regulator signals the microprocessor block 804 when a low battery condition exists and a low battery data log entry is made. The RTC block 728 employs a battery back-up circuit such that in the event of a low battery condition, then the current date and time are retained.

Turning next to FIG. 5b, an alternative capacitive detector 700' in which a microprocessor is not employed is illustrated. In this embodiment, the capacitive electrode 801 is connected to the capacitive grid 803. The power block 802 is comprised of a battery and power regulator. Power block 802 is cooperatively connected to the capacitive sensing circuit 803 and the relay output block 701. Relay output block 701 is also connected to data logging block 702. This alternative capacitive pest detector 700' utilizes a dry contact relay as an output. The output can be used to signal any number of outboard devices for pest activity.

Figure 6:
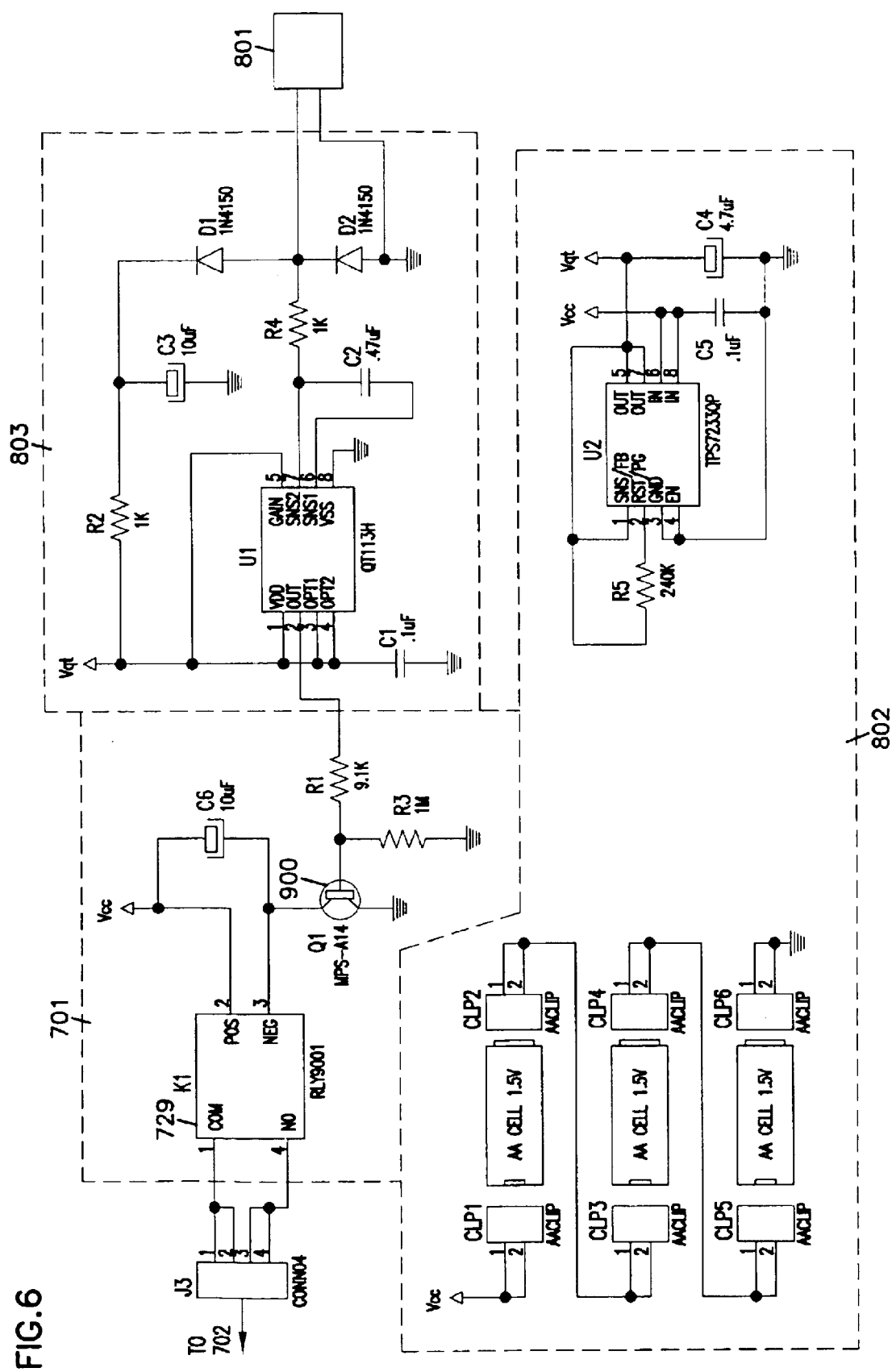
FIG. 6 illustrates a preferred embodiment capacitive sensing circuit which may be employed in connection with the present invention.

In this alternative design, the capacitive sensing circuit block 803 preferably includes a QProx QT113H chip manufactured by Quantum Research Group. The electrodes 801 are preferably etched directly into the printed circuit board on which the electronics resides. The output of the capacitive sensing circuit block 803 preferably drives an open collector switching transistor 900 (best seen in FIG. 6) to control a single pole single throw (SPST) normally open dry contact reed relay 729. FIG. 6 illustrates the manner in which the capacitive sensing circuit block 803, the battery and power supply regulator block 802 and the relay output block 701 is preferably implemented. It will be appreciated, however, that this preferred schematic is illustrative and other circuits may be used to provide the functionality described for these functional blocks.

The data logging block 702 may be implemented with a data logging device manufactured by Omega Engineering under the designation OM-CP-PULSE 101. This device may be cooperatively connected to the relay output block 701 to track pest activity. The data logging block 702 records the activity as well as the time and date of the activity. A communications port (not shown) may be connected to download the logged activity.

In operation, when a pest enters the electrode 801 area, the capacitive sensor block 803 triggers the relay block 701 for a time period. In the preferred embodiment, the maximum time period is ten (10) seconds. However, this time period is a function of the capacitive sensor chip used in the preferred embodiment and so other time periods may be used. When the relay block 701 is closed, then the data logging block 702 counts the contact closure. On pre-programmed intervals, the data logging block 702 saves the current count to non-volatile memory internal to the data logging block 702. Periodically, the information is downloaded to a computer via the communications port (not shown). In the preferred embodiment, the data may be downloaded into a spreadsheet or other programs that can read comma separated files (CSV).

While particular embodiments of the invention have been described with respect to its application, it will be understood by those skilled in the art that the invention is not limited by such application or embodiment or the particular components disclosed and described herein. It will be appreciated by those skilled in the art that other components that embody the principles of this invention and other applications therefor other than as described herein can be configured within the spirit and intent of this invention. The arrangement described herein is provided as only one example of an embodiment that incorporates and practices the principles of this invention. Other modifications and alterations are well within the knowledge of those skilled in the art and are to be included within the broad scope of the appended claims.

What is claimed is:

1. A capacitive pest monitor apparatus, comprising:
   a) a plurality of capacitive electrodes;
   b) a capacitive sensing circuit, operatively connected to the capacitive electrodes, the capacitive sensing circuit detecting the capacitance of the electrodes and detecting changes in the capacitance due to pests passing over the capacitive electrodes and generating a pest detection signal; and
   c) a pest detection signal storage device, the storage device operatively connected to the capacitive sensing circuit, the storage device receives the pest detection signal and stores the signal for later analysis.

2. The apparatus of claim 1, wherein the capacitive sensing circuit monitors the capacitance of the capacitive electrodes continuously.

3. The apparatus of claim 1, wherein the capacitive electrodes run generally parallel to each other.

4. The apparatus of claim 3, wherein the capacitive electrodes extend completely around an area to be monitored.

5. The apparatus of claim 1, wherein the capacitive electrodes are interdigitized with one another.

6. The apparatus of claim 5, wherein the capacitive electrodes completely cover an area to be monitored.

7. The apparatus of claim 1, wherein the storage device is a non-volatile memory device; and
   further comprising:
   a) a real time clock device which is arranged and configured to keep time and to provide real time clock signals; and
   b) a processor, operatively connected to the real time clock device and between the storage device and the capacitive sensing circuit, the processor monitoring the capacitive sensing circuit and storing the pest detection signals together with real time clock signals in the non-volatile memory device, whereby the time a pest passes over the capacitive electrodes is preserved and the information is stored in close proximity to when the event occurred.

8. The apparatus of claim 1, further comprising a trapping element.

9. The apparatus of claim 1, wherein the storage device is a data logger device cooperatively connected to a relay block, wherein the relay block is triggered by the pest detection signal and the data logger device senses the triggering of the relay block and stores the event.

10. The apparatus of claim 9, wherein the data logger device is arranged and configured to maintain a time signal which can be combined with the stored event.

11. The apparatus of claim 10, further comprising a trapping element.

12. The apparatus of claim 10, further comprising sensors arranged and configured to accept additional manual input.

13. The apparatus of claim 12, wherein the manual input includes data on the condition of the pest monitor when it is inspected.

14. A capacitive pest monitor apparatus, comprising:
 a) a plurality of capacitive electrodes;
 b) detecting means for detecting changes in the capacitance of the electrodes, the detecting means operatively connected to the capacitive electrodes and arranged and configured to generate a pest detection signal; and
  c) event storing means, operatively connected to the detecting means, for storing the pest detection signal as an event, the event storing means arranged and configured to store each event with an indication of the time and date.

15. The apparatus of claim 14, wherein the detecting means monitors the capacitance of the capacitive electrodes continuously.

16. The apparatus of claim 14, wherein the capacitive electrodes run generally parallel to each other.

17. The apparatus of claim 16, wherein the capacitive electrodes extend completely around an area to be monitored.

18. The apparatus of claim 14, wherein the capacitive electrodes are interdigitized with one another.

19. The apparatus of claim 18, wherein the capacitive electrodes completely cover an area to be monitored.

20. The apparatus of claim 14, further comprising a trapping element.

21. A method of detecting the presence of one or more pests by detecting changes in capacitance between a plurality of capacitive electrodes, comprising:
 a) measuring the capacitance of the electrodes;
 b) generating a pest detection signal upon measuring a predetermined change in the measured capacitance; and
 c) storing the pest detection signal as an event combined with an indication of the time and date of the event.

22. A pest reporting system, comprising:
 a) a pest report database;
 b) a plurality of capacitive pest detecting sensors, the capacitive pest detecting sensors associated with respective activity sensing pest devices, the sensors being arranged and configured to determine if a pest is in the area monitored by the sensor and to generate a pest signal,
 c) manual input sensors associated with the respective activity sensing pest devices, the manual input sensors being arranged and configured to accept additional manual input; and
 d) a communication device, operatively connected to the capacitive pest detecting sensors and the manual input sensors, for receiving the pest signal and for communicating to the pest report database that a pest signal occurred and the specific activity sensing pest device at which the pest signal occurred, and wherein the pest report database is updated.

23. The pest reporting system of claim 22, wherein the activity sensing pest devices include a pest trap.

* * * * *